United States Patent
Tiedt et al.

(10) Patent No.: US 10,452,461 B2
(45) Date of Patent: Oct. 22, 2019

(54) DISCOVERING AND SAFELY TRANSITIONING TRANSACTORS TO RUN MODE

(71) Applicant: Rockwell Automation Technologies, Inc., Mayfield Heights, OH (US)

(72) Inventors: Douglas F. Tiedt, Oconomowoc, WI (US); Michael W. Wielebski, Cedarburg, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 210 days.

(21) Appl. No.: 15/828,145

(22) Filed: Nov. 30, 2017

(65) Prior Publication Data

US 2019/0163558 A1 May 30, 2019

(51) Int. Cl.
*G06F 11/07* (2006.01)
*G06F 3/06* (2006.01)

(52) U.S. Cl.
CPC ...... *G06F 11/0772* (2013.01); *G06F 11/0706* (2013.01); *G06F 11/0751* (2013.01); *G06F 3/0688* (2013.01)

(58) Field of Classification Search
CPC ............. G06F 11/0706; G06F 11/0751; G06F 11/0772; G06F 3/0688
See application file for complete search history.

(56) References Cited

U.S. PATENT DOCUMENTS

| | | | | |
|---|---|---|---|---|
| 2010/0153053 A1* | 6/2010 | Bose | ...... | G06F 11/26 702/119 |
| 2013/0003736 A1* | 1/2013 | Szyszko | ...... | H04L 47/2441 370/392 |
| 2013/0073821 A1* | 3/2013 | Flynn | ...... | G06F 3/061 711/162 |
| 2014/0006685 A1* | 1/2014 | Peterson | ...... | G06F 12/0238 711/102 |
| 2015/0381560 A1* | 12/2015 | Chippa | ...... | H04L 67/1095 709/226 |

* cited by examiner

*Primary Examiner* — Jigar P Patel
(74) *Attorney, Agent, or Firm* — Kunzler Bean & Adamson

(57) ABSTRACT

For discovering and safely transitioning transactors to a run mode, a message module determines if a message received from a communication master after a reset is a discovery message and determines if the message is an initial message received from the communication master. A command module, in response to the message not being the discovery message and the message being the initial message, activates a safety fault. In addition, the command module, in response to the message not being the discovery message and not being the initial message, determines whether the message comprises a valid safety command. In response to the message including a valid safety command, the command module enters the run mode.

20 Claims, 17 Drawing Sheets

250

| 251 |

| 253 |

| 255 | 257 | 259 | 273 | 261 |

FIG. 1C

| 263 |

| 257 | 259 |

FIG. 1D

DISCOVERING AND SAFELY TRANSITIONING TRANSACTORS TO RUN MODE

BACKGROUND INFORMATION

The subject matter disclosed herein relates to discovering and safely transitioning transactors to a run mode.

BRIEF DESCRIPTION

An apparatus for discovering and safely transitioning transactors to a run mode is disclosed. The apparatus includes a message module and a command module. The message module determines if a message received from a communication master after a reset is a discovery message and determines if the message is an initial message received from the communication master. The command module, in response to the message not being the discovery message and the message being the initial message, activates a safety fault. In addition, the command module in response to the message not being the discovery message and not being the initial message, determines whether the message comprises a valid safety command. In response to the message comprising a valid safety command, the command module enters the run mode. The message module and the command module are implemented in semiconductor hardware.

A method for discovering and safely transitioning transactors to a run mode is disclosed. The method sends a discovery message to a logical interface. In response to receiving a discovery message response from the responding logical interface, the method records a responding logic interface identifier for the responding logic interface. In response to a loop count exceeding a loop threshold, the method sends a safety message to the responding logic interface.

A method for discovering and safely transitioning transactors to a run mode is disclosed. The method determines by use of semiconductor hardware, if a message received from a communication master after reset is a discovery message. The method further determines if the message is an initial message received from the communication master. In response to the message not being the discovery message and the message being the initial message, the method activates a safety fault. In response to the message not being the discovery message and not being the initial message, the method determines whether the message comprises a valid safety command. In response to the message comprising a valid safety command, entering the run mode.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1C is a schematic block diagram of communications according to an embodiment;

FIG. 1D is a schematic block diagram of a discovery message response according to an embodiment;

DETAILED DESCRIPTION

Figure 1A:
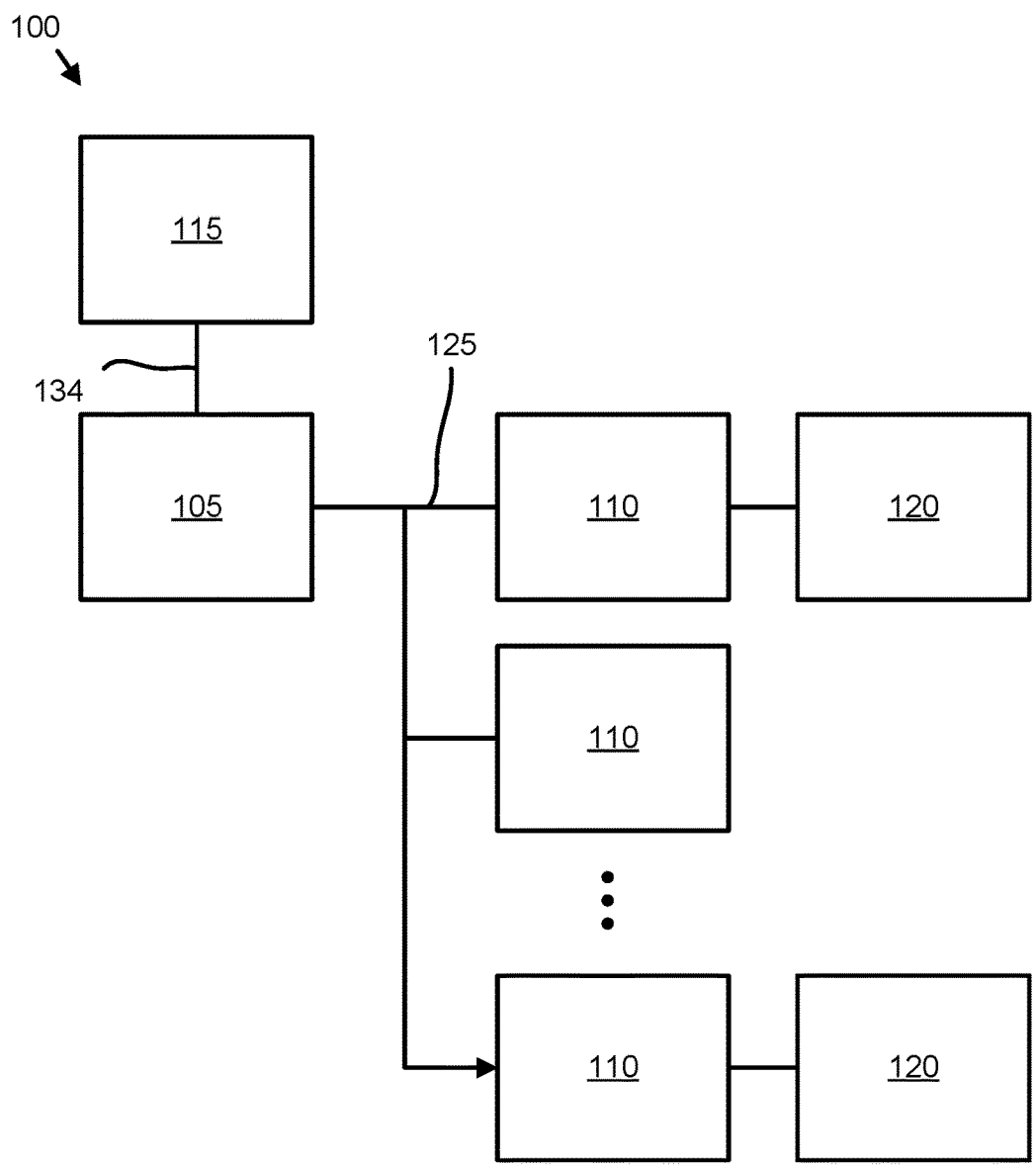
FIG. 1A is a schematic block diagram of safety system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object-oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of safety system 100. The safety system 100 may be embodied in an industrial control system. In the depicted embodiment, the safety system 100 includes a safe torque off (STO) card 115, a communication master 105, one or more logic interfaces 110, and one or more equipment units 120. A logic interface 110 may communicate with an equipment unit 120. In addition, a logic interface 110 may be embedded in an equipment unit 120. Alternatively, a logic interface 110 may perform a stand-alone function. In one embodiment, a logic interface 110 is a programmable logic interface.

The communication master 105 may communicate with the logic interfaces 110 over a dedicated bus 125. In one embodiment, the dedicated bus 125 is not a fiber link bus. In addition, the communication master 105 may communicate with the STO card 115 over a device bus 134.

The communication master 105 may communicate commands and messages, referred to collectively as communications, to the logic interfaces 110. In one embodiment, a logic interface 110 may further communicate commands and messages to the corresponding equipment unit 120. The equipment unit 120 may be an inverter for a motor, a converter, or the like.

The communication master 105 and the logic interfaces 110 may be powered on and/or reset at different times. As a result, the communications master 105 and one or more logic interfaces 110 may be reset independently. For example, the communication master 105 and the logic interfaces 110 may be stored in different cabinets and/or connected to different power supplies. As a result, the communication master 105 and the logic interfaces 110 may not be synchronized when powered on and/or reset. As a result, the communication master 105 and the logic interfaces 110 may begin communicating and/or receiving communications at different times. In addition, communications between the communication master 105 and the logic interfaces 110 may be affected by noise and/or packet loss over the dedicated bus 125.

It is vital that communications between the communication master 105 and the logic interfaces 110 be reliably established. In addition, it is necessary that the logic interfaces 110 and/or equipment units 120 remain in a safe state until communications are established and the logic interfaces 110 are commanded to de-assert safety.

The embodiments described herein discover transactors such as the logic interfaces 110 and safely transition the logic interfaces 110 to a run mode as will be described hereafter. As a result, the communication master 105 and the logic interfaces 110 safely and deterministically establish communications. In addition, the communication master 105 safely and deterministically command the logic interfaces 110 to de-assert safety and to enter a run mode.

Figure 1B:
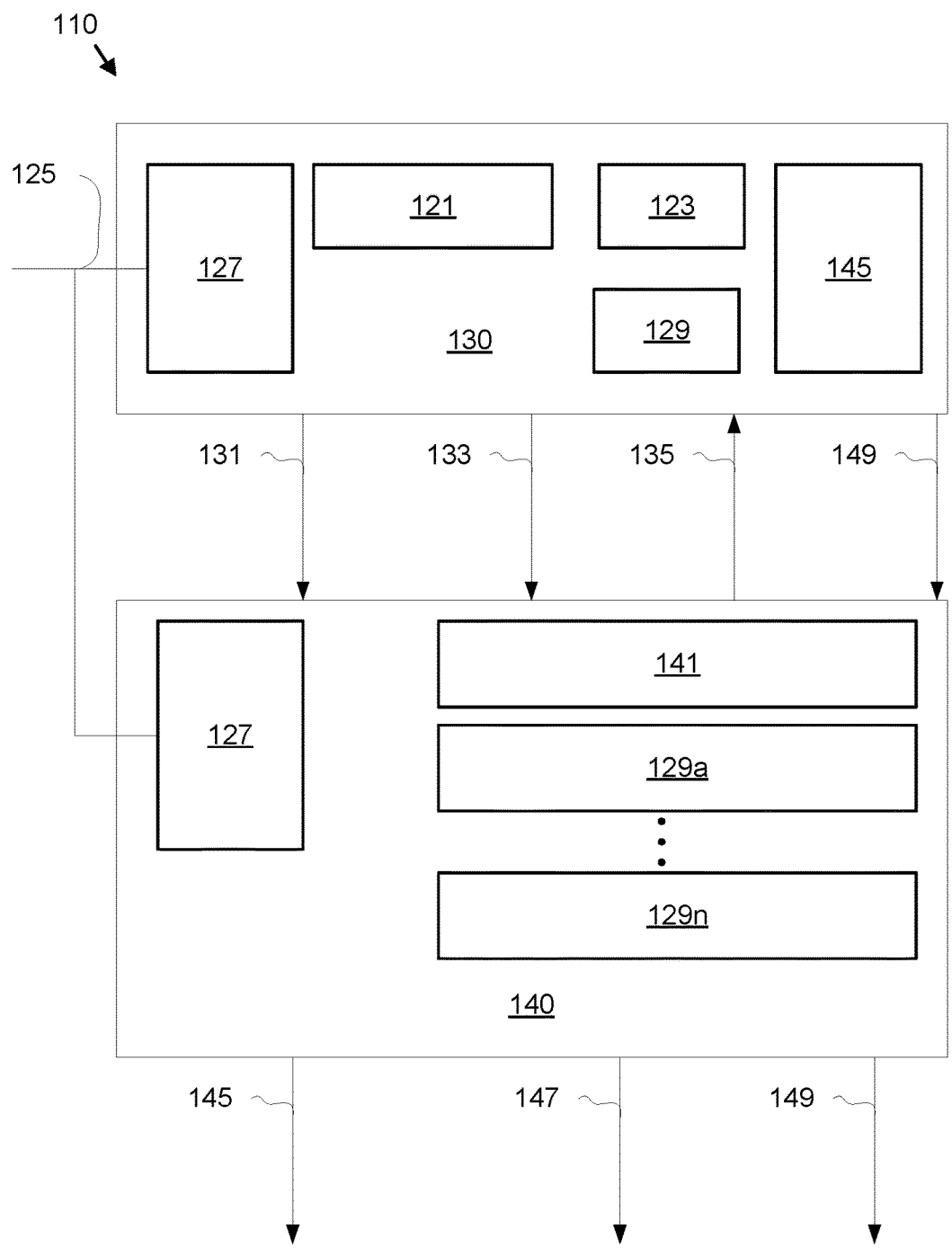
FIG. 1B is a schematic block diagram of interface logic according to an embodiment.

FIG. 1B is a schematic block diagram of an interface logic 110. The logic interface 110 maybe organized as semiconductor hardware such as one or more semiconductor gates and/or semiconductor functions. The logic interface 110 may be implemented using semiconductor hardware so the design of the logic interface 110 may be reliably validated for performing safety operations. In the depicted embodiment, the logic interface 110 includes a message module 130 and a command module 140.

The message module 130 and/or command module 140 includes a communication buffer 127. The communication buffer 127 is in communication with the dedicated bus 125. The message module 130 and/or the command module 140 may communicate with communications master 105 over the dedicated bus 125. The message module 130 may include a message counter 121, a discovery message flag (DMF) register 123, a configuration register 129, and a command register 145.

The message counter 121 may count the number of messages received at the communication buffer 127 from the communication master 105 over the dedicated bus 125. In one embodiment, the message counter 121 is reset to zero in response to the logic interface 110 being powered on and/or reset. In addition, the message counter 121 may be incremented each time a message is received at the communication buffer 127.

The DMF register 123 may be set in response to receiving a discovery message from the communication master 105. The DMF register 123 may be reset in response to the logic interface 110 being powered on and/or reset. The configuration register 129 may record a configuration of the logic interface 110. The configuration may be one of an inverter and a converter. In addition, other configurations may be encoded. In one embodiment, the configuration is of a corresponding equipment unit 120.

The message module 130 may communicate a discovery message signal 131, an initial message signal 133, and/or a converter signal 149 to the command module 140. The discovery message signal 131 may indicate that a discovery message is received over the dedicated bus 125. The initial message signal 133 may indicate that a message received over the dedicated bus is an initial or first message from the communication master 105. The converter signal 149 may be asserted if the logic interface 110 is embedded in and/or associated with a converter. If the converter signal 149 is de-asserted, the logic interface 110 may be embedded in and/or associated with an inverter. The message module 130 may further receive a send response signal 135 from the command module 140. The send response signal 135 may direct the message module 130 to respond to a discovery message.

The command module 140 may include a state machine 141 and a plurality of valid safety command registers 129. The state machine 141 may control the logic interface 110. The valid safety command registers 129 may store examples of valid safety commands. For example, a safety command that is parsed from a message and stored in the command register 145 may be compared with the valid safety command registers 129. If the safety command matches one of the valid safety command register values, the safety command is a valid safety command.

The command module 140 may generate an enter run mode signal 145, an activate safety fault signal 147, and a functional safety on/off signal 149. The enter run mode signal 145 may direct the equipment unit 120 and/or logic interface 110 to enter a run mode. The activate safety fault signal 147 may cause the state machine 141 to enter a safety fault state. The functional safety on/off signal 149 may enable a functional safety on and disable the functional safety off as will be described hereafter.

FIG. 1C is a schematic block diagram of communications 250. The communications 250 include a channel communication 251. The channel communication 251 may be encoded and communicated over the dedicated bus 125. The message 253 may be embedded in the channel communication 251. The message 253 may be a discovery message 253. In addition, the message 253 may be an initial message 253. Alternatively, the message 253 may include a command 273 for the logic interface 110 and/or the equipment unit 120.

The message 253 may comprise a specified number of bits. In the depicted embodiment, the message 253 includes safety indicators 255, a channel number 257, a revision number 259, the command 273, and an error correction code 261. The safety indicators 255 may comprise bits that indicate one of an execute message and respond state and a run mode state. The channel number 257 may uniquely identify a logic interface 110. The revision number 259 may identify unique hardware and/or software revision for the logic interface 110 and/or the equipment unit 120. The command 273 may be a safety command 273. The command 273 may be directed to one of the logic interface 110 and the equipment unit 120. The error correction code 261 may be used to determine if the message 253 was communicated without errors.

FIG. 1D is a schematic block diagram of a discovery message response 263. The discovery message response 263 may be communicated from the logic interface 110 to the communication master 105 in response to the logic interface 110 receiving a discovery message 253 from the communication master 105. The discovery message response 263 may be encoded for transmission and/or stored in a memory. In one embodiment, the discovery message response 263 includes the channel number 257 and the revision number 259.

Figure 2A:
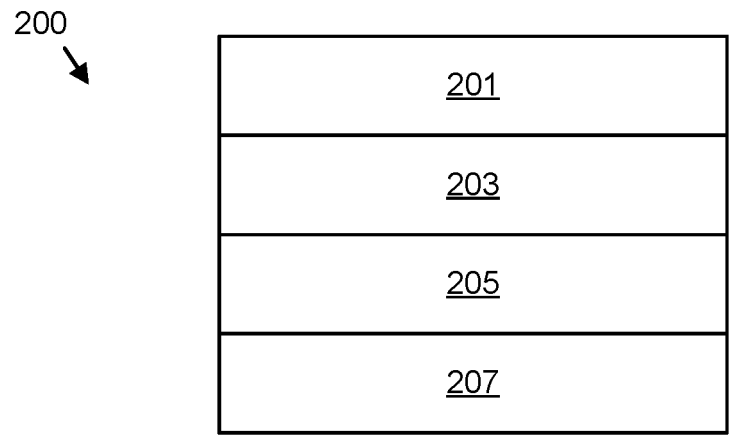
FIG. 2A is a schematic block diagram of logic interface data according to an embodiment.

FIG. 2A is a schematic block diagram of logic interface data 200. The logic interface data 200 may be employed for a software implementation of the logic interface 110. The logic interface data 200 maybe organized as a data structure in a memory. In the depicted embodiment, the logic interface data 220 includes a message counter 201, a discovery message flag 203, a valid safety command template 205, and a configuration type 207.

The message counter 201 may count the number of messages 253 received from the communication master 105 over the dedicated bus 125. The message counter 201 may be incremented each time a message 253 is received at the communication buffer 127. In addition, the message counter 201 may be reset to zero when the logic interface 110 is powered on and/or reset.

The discovery message flag 203 may indicate that a discovery message 253 was received from the communication master 105. The discovery message flag 203 may be reset in response to the logic interface 110 being reset and/or powered on.

The valid safety command template 205 may store a plurality of valid safety commands. The valid safety commands may be used to identify a valid safety command from the communication master 105. The configuration type 207 may indicate a configuration of the logic interface 110 and/or equipment unit 120. In one embodiment, the configuration type 207 is one of a converter and an inverter.

Figure 2B:
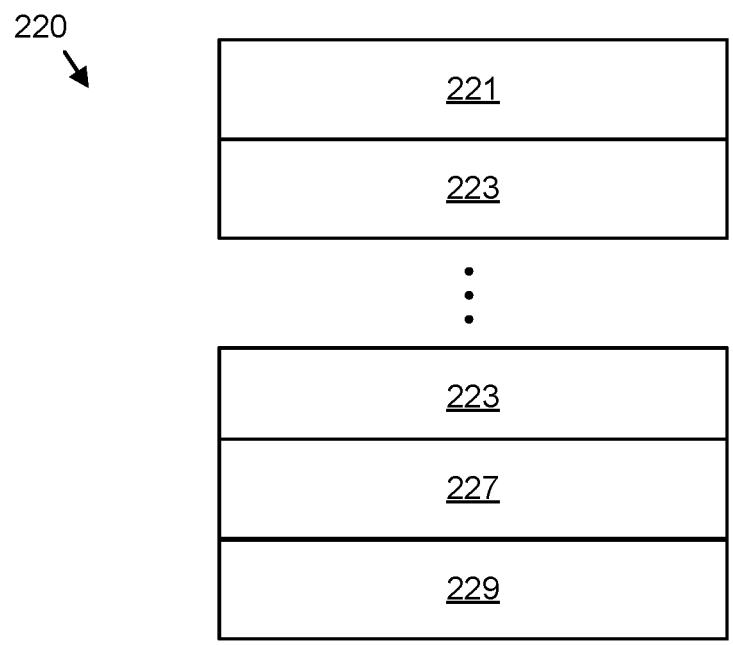
FIG. 2B is a schematic block diagram of communication master data according to an embodiment.

FIG. 2B is a schematic block diagram of communication master data 220. The communication master data 220 maybe organized as a data structure in a memory. In the depicted embodiment, the communication master data 220 includes a response interval 221, one or more responding logic interface identifiers 223, a loop count 227, and a loop threshold 229.

The response interval 221 may specify a time interval that the communication master 105 waits after communicating a discovery message 253 to one or more logic interfaces 110. Each responding logic interface identifier 223 may record a logic interface 110 that responded to a discovery message 253. In one embodiment, the responding logic interface identifiers 223 record a channel number 257 for the responding logic interface 110. In addition, the responding logic interface identifiers 223 may store a revision number 259 for the logic interface 110 and/or the equipment unit 120.

The loop count 227 may specify a number of discovery messages 253 communicated from the communication master 105. In addition, the loop count 227 may specify a number of response intervals 221 that the communication master 105 waited for discovery message responses 263 from the logic interfaces 110. The loop threshold 229 may be a maximum number of the loop count 227 before the communication master 105 stops communicating discovery messages 253 as will be described hereafter.

Figure 3A:
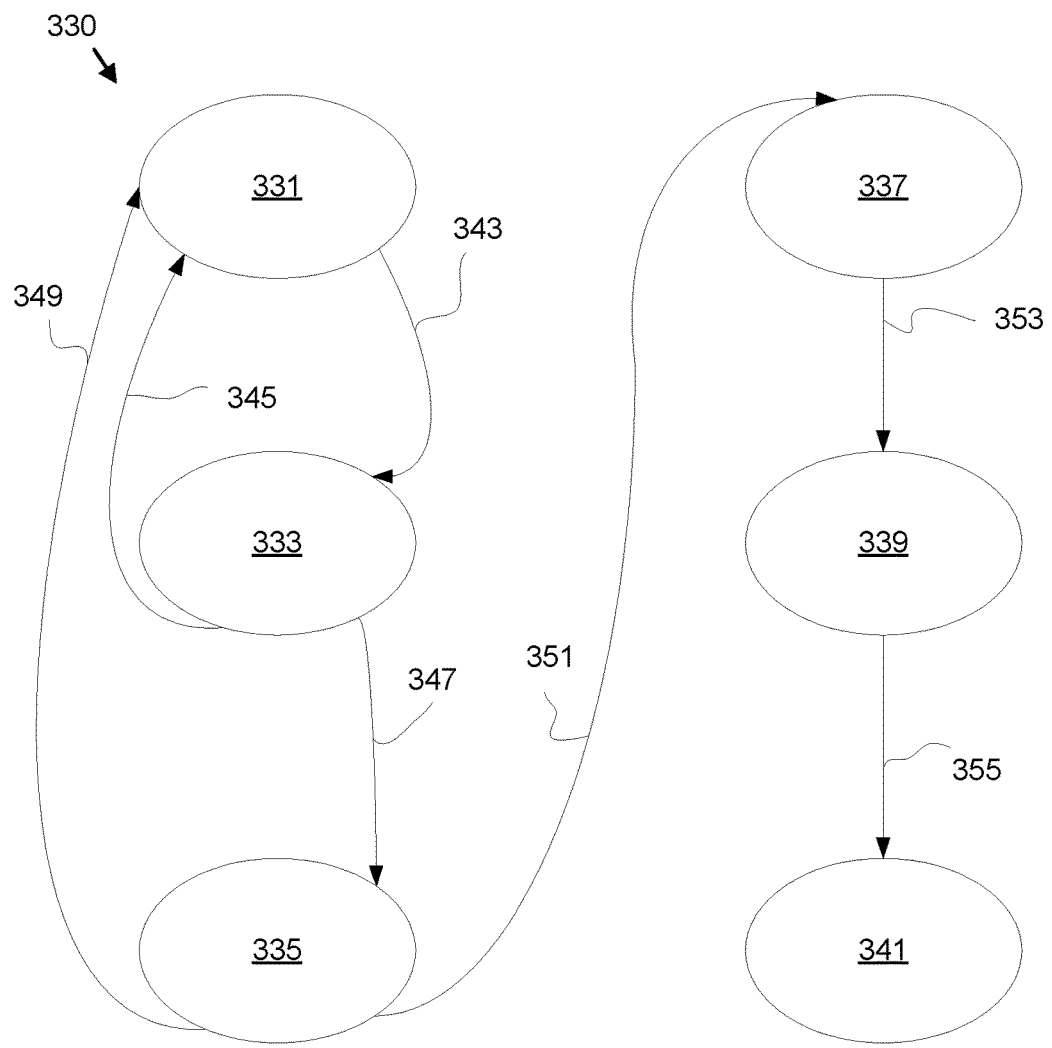
FIG. 3A is a schematic state diagram of communication master states according to an embodiment.

FIG. 3A is a schematic state diagram of communication master states 330. The communication master states 330 represent the operational states of the communication master 105 during the discovery of the logic interfaces 110 and the safe transition of logic interfaces 110 to a run mode and/or a safety fault. In the depicted embodiment, the communication master 105 starts in a discovery state 331. The discovery state 331 may be entered in response to a reset and/or power on of the communication master 105. From the discovery state 331, the communication master 105 may send 343 discovery messages 253 to each logic interface 110 and enter a wait state 333.

The communication master 105 may remain in the wait state 333 until the response interval 221 expires. Upon the expiration of the response interval 221, the communication master 105 returns to the discovery state 331 if no discovery message responses 263 are received 345. If discovery message responses 263 are received 347 during the wait state 333, the communication master 105 enters a record logic interfaces state 335. In the record logic interfaces state 335, the communication master 105 records the responding logic interface identifiers 223 for all responding logic interfaces 110 to the communication master data 220.

If the loop count 227 does not exceed 349 the loop threshold 229 or if a first discovery message response 263 is received, the communication master 105 returns 349 to the discovery state 331 and sends 343 discovery messages 253 to each logic interface 110. If the loop count 227 exceeds the loop threshold 229, the communication master 105 enters 351 the send responding logic interface identifiers to firmware state 337, sends 353 the responding logic identifiers 223 to firmware such as firmware executing on the STO 115, and enters 353 the send functional safety to responding logic interfaces state 339. The communication master 105 may send 355 the functional safety to the responding logic interfaces 110, enable safety diagnostics, and enter the run mode 341.

Figure 3B:
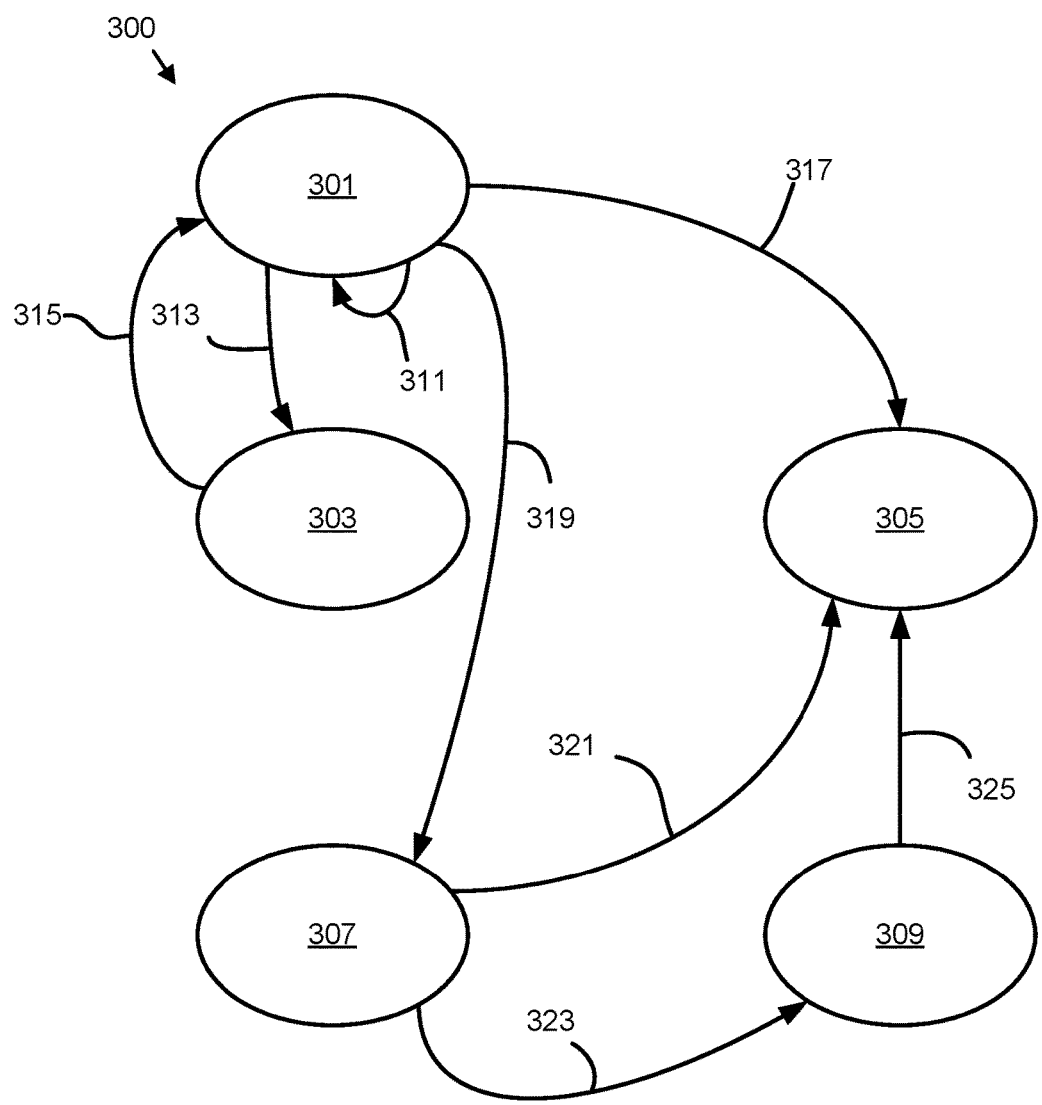
FIG. 3B is a schematic state diagram of logic interface inverter states according to an embodiment.

FIG. 3B is a schematic state diagram of logic interface states 300. The logic interface states 300 may specify the function of an inverter logic interface 110 during the discovery of the logic interface 110 and the safe transition of the logic interface 110 to the run mode 309 and/or the safety fault 305. The logic interface 110 may be an inverter logic interface 110 if the converter signal 149 is de-asserted. In the depicted embodiment, the logic interface 110 starts in a logic interface wait state 301.

If no discovery messages 253 are received 311, the logic interface 110 remains in the logic interface wait state 301. The discovery message signal 131 may be de-asserted if no discovery messages 253 are received 311. If the discovery message 253 is received 313, the logic interface 110 enters the send response state 303. In one embodiment, the discovery message signal 131 is asserted in response to receiving 313 the discovery message 253. The logic interface 110 further sends 315 the discovery message response 263 over the dedicated bus 215 to the communication master 105 and enters the logic interface wait state 301.

From the logic interface wait state 301, if an initial message 253 received 317 by the logic interface 110 is not a discovery message 253, the logic interface 110 enters the safety fault state 305. In one embodiment, the initial message signal 133 is asserted and the discovery message signal 331 is de-asserted to indicate that the initial message 253 received 317 by the logic interface 110 is not the discovery message 253.

From the logic interface wait state 301, if a message 253 is received 319 that is not a discovery message 253 and is not the initial message 253, the logic interface 110 enters the execute message and respond state 307. In one embodiment, the initial message signal 133 is de-asserted in the discovery message signal 131 is de-asserted to indicate that the message 253 received 319 is not a discovery message 253 and is not the initial message 253.

From the execute message in response state 307, if an invalid safety command 273 is received 321 in the message 253, the logic interface 110 enters the safety fault state 305. If a valid safety command 273 is received 323 in the message 253, the logic interface 110 enters the run mode/safety on/off state 309. In the run mode/safety on/off state 309, the communication master 105 may communicate a safety on command 273 and a safety off command 273 to the logic interface 110 to toggle a functional safety on and off respectively.

In one embodiment, if the discovery message 253 is received 325 in the run mode/safety on/off state 309, the logic interface 110 enters the safety fault state 305. The discovery message signal 131 may be asserted to indicate a discovery message 253.

Figure 3C:
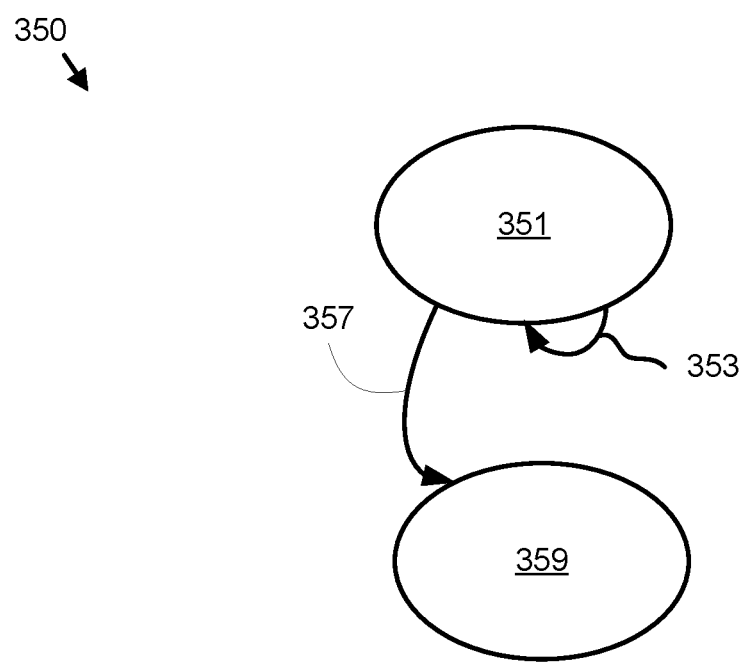
FIG. 3C is a schematic state diagram of logic interface converter states according to an embodiment.

FIG. 3C is a schematic state diagram of logic interface converter states 350. If the logic interface 110 is a converter logic interface 110, the logic interface 110 enters a logic interface wait state 351. The converter signal 341 may be asserted to indicate that the logic interface 110 is a converter. If no message 253 is received 353, the logic interface 110 remains in the logic interface wait state 351. If a message 253 is received 357, the logic interface 110 enters a safety fault state 359.

Figure 4:
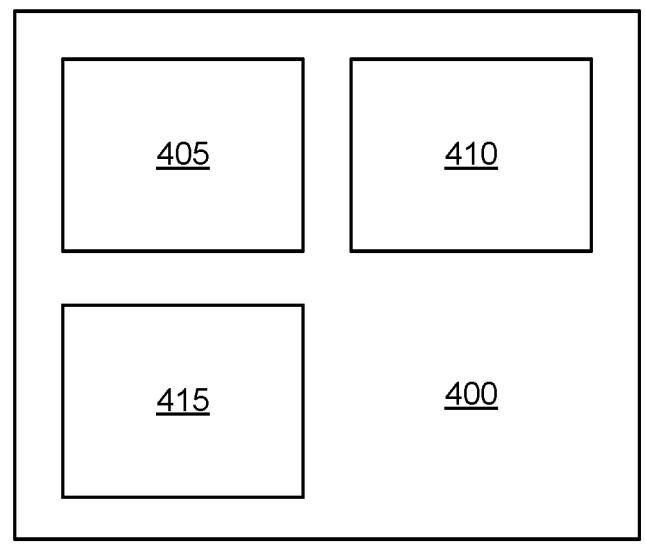
FIG. 4 is a schematic block diagram of a computer according to an embodiment.

FIG. 4 is a schematic block diagram of a computer 400. The computer 400 may be embodied in the communication module 105. In the depicted embodiment, the computer 400 includes a processor 405, a memory 410, and communication hardware 415. In a certain embodiment, the computer 400 is embodied in the logic interface 110. The memory 410 may be a semiconductor storage device. In one embodiment, the memory 410 includes a plurality of registers. In addition, the memory 410 may include a hard disk drive, an optical storage device, and combinations thereof. The memory 410 may store code. The processor 405 may execute the code. The communication hardware 415 may communicate with other devices including but not limited to through the dedicated bus 125 and through the device bus 134.

Figure 5A:
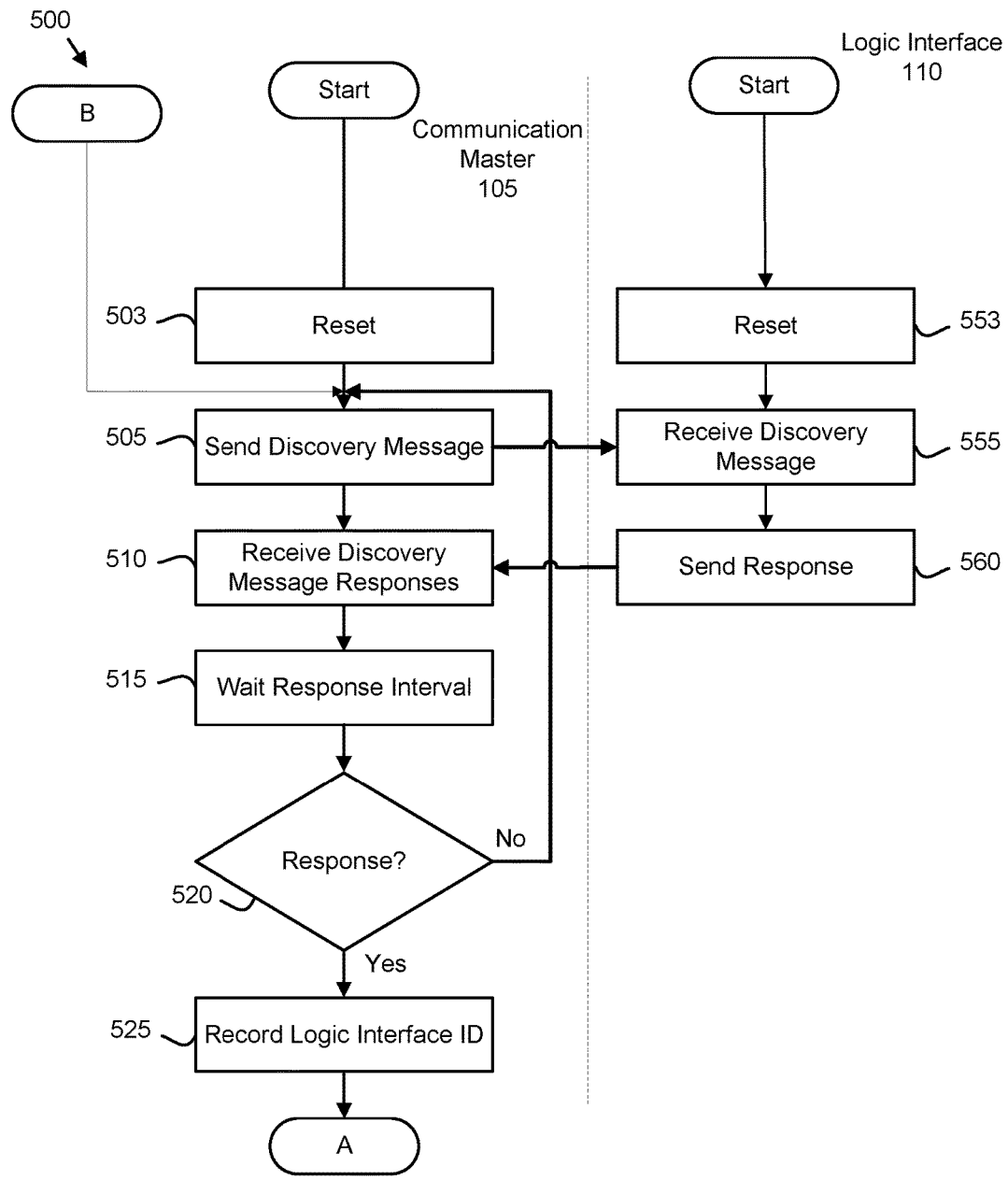
FIGS. 5A-B is a schematic flow chart diagram of a transactor transition method according to an embodiment.
Figure 5B:
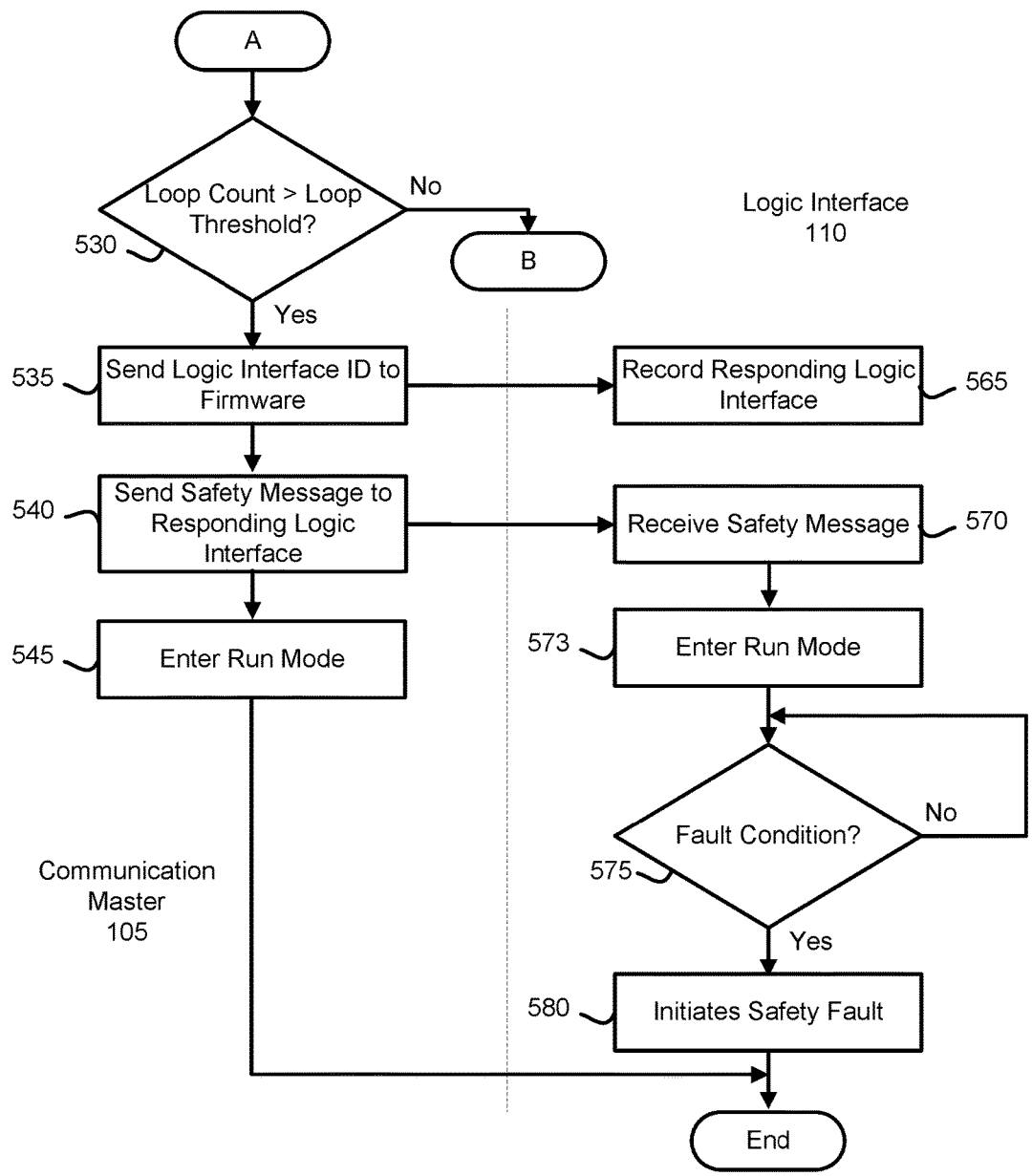

FIGS. 5A-B is a schematic flow chart diagram of a transactor transition method 500. The method 500 may safely transition the communication master 105 and the logic interfaces 110 through the discovery of the logic interfaces 110 and through the safe transition of logic interfaces 110 to a run mode and/or a safety fault. The method may be performed by the communication master 105, the logic interface 110, or combinations thereof. The method 500 starts, and in one embodiment, the communication master 105 503 and/or the logic interface 110 resets 553. As used herein, resetting 503/553 includes powering on. The communication master 105 and the logic interface 110 may be reset 503/553 independently. Alternatively, the communication master 105 and the logic interface 110 may be reset 503/553 concurrently. In one embodiment, a plurality of logic interfaces 110 are reset 553, but are not reset in a specified order.

The communication master 105 sends 505 the discovery message 253 via the dedicated bus 125 to the logic interface 110. The communication master 105 may send 505 the discovery message 253 to the plurality of logic interfaces 110, although for simplicity interactions with a single logic interface 110 is described. The communication master 105 may enter the discovery state 331 in response to the reset 503 and send 505 the discovery message 253 from the discovery state 331. The logic interface 110 may enter the logic interface wait state 301 in response to the reset 553 and receive 555 the discovery message 253.

The logic interface 110 may send 560 the discovery message response 263 in response to receiving 550 the discovery message 253. The discovery message response 263 may be communicated from the communication buffer 127 via the dedicated bus 125 to the communication master 105. The communication master 105 may receive 510 the discovery message response 263 if the discovery message response 263 is sent 560. The communication master 105 may further wait 515 the response interval 221, receiving discovery message responses 263.

The communication master 105 may determine 520 if the discovery message response 263 was received. If no discovery message response 263 was received, the communication master 105 again sends 505 discovery messages 253 to the logic interface 110. If at least one discovery message response 263 was received, the communication master 105 records 525 the responding logic interface identifier 223 of the responding logic interface 110 such as in the record logic interfaces state 335. The communication master 105 further determines 530 if the loop counter 227 exceeds the loop threshold 229. If the loop count 227 does not exceed the loop threshold 229, the communication master 105 sends 505 the discovery message 253 to the logic interface 110.

If the loop count 227 exceeds the loop threshold 229, the communication master 105 sends 535 the responding logic interface identifier 223 to firmware. The firmware may execute on the STO card 115. Alternatively, the firmware may execute on the communication master 105. The firmware may record 565 the responding logic interfaces 110 and/or responding logic interface identifiers 223. In one embodiment, the firmware determines if the responding logic interface 110 is properly configured by comparing the responding logic interfaces 110 to a configuration file and/or configuration database.

The communication master 105 may send 540 a safety message 253 to the responding logic interface 110. The logic interface 110 may be in the execute message and respond state 307 and the communication master 105 may be in the send safety to responding logic interfaces state 339. The safety message 253 may include a valid safety off command 273. The responding logic interface 110 may receive 570 the safety message 253 and enter 573 the run mode of the run mode/safety on/off state 309. The logic interface 110 may assert the function safety on/off signal 149 to activate safety and de-assert the function safety on/off signal 149 to deactivate safety for the logic interface 110 and/or equipment unit 120. The logic interface 110 and/or equipment unit 120 may operate with the safety deactivated.

The communication master 105 may enter 545 the run mode of the run mode state 341. The logic interface 110 may further determine 575 if a fault condition occurs. The fault condition may include receiving a discovery message 253. If no fault condition occurs, the logic interface 110 continues to monitor for the fault condition. If the fault condition occurs, the logic interface 110 initiates 580 a safety fault wherein the logic interface 110 enters the safety fault state 305 and the method 500 ends.

Figure 5C:
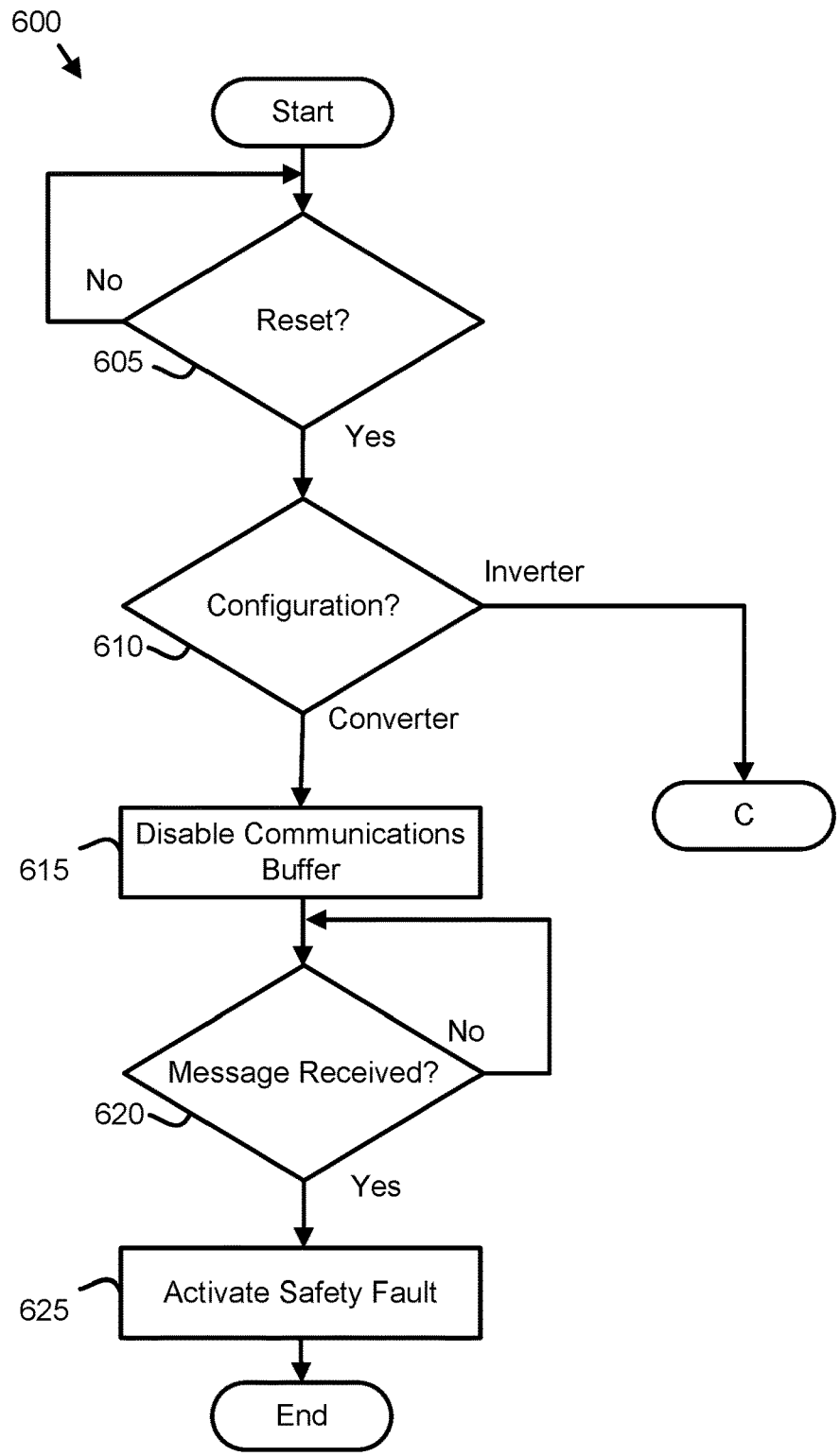
FIGS. 5C-D is a schematic flow chart diagram of a logic interface initialization method according to an embodiment.
Figure 5D:
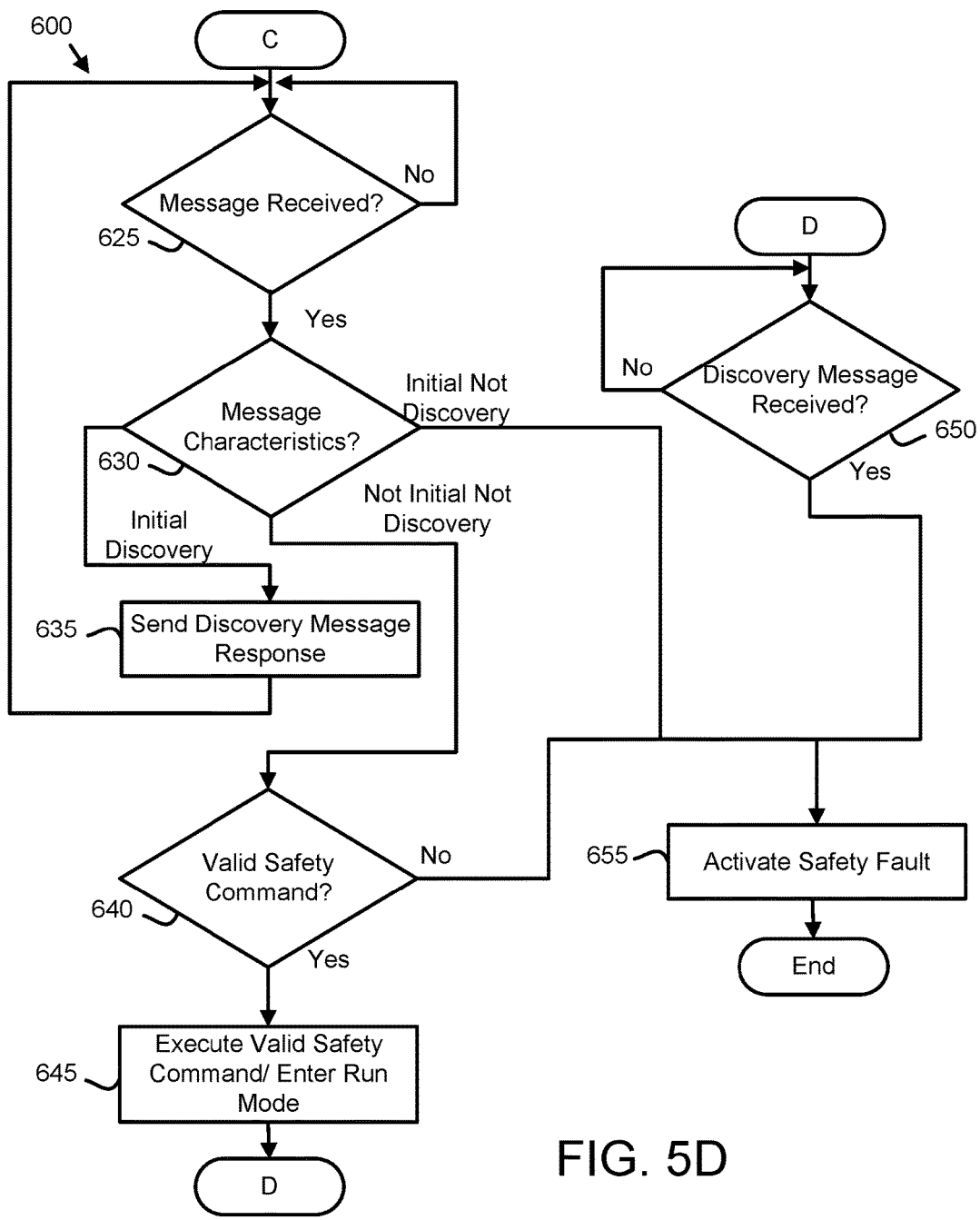

FIGS. 5C-D is a schematic flow chart diagram of a logic interface initialization method 600. The method 600 may initialize the logic interface 110. The method 600 may be performed by the logic interface 110. The method 600 may initialize a plurality of logic interfaces 110. However, for simplicity, the method is described for a single logic interface 110.

The logic interface 110 determines 605 if a reset and/or power on occurs. If no reset and/or power on occurs, the logic interface 110 continues to monitor for the reset and/or power on. If the reset and/or power on of the logic interface 110 occurs, the logic interface 110 may determine 610 whether the logic interface 110 is a converter or an inverter. The logic interface 110 may test the configuration register 129 to determine whether the logic interface 110 is a converter or an inverter. Alternatively, the logic interface 110 may consult the configuration type 207 to determine 610 whether the logic interface 110 is a converter or an inverter.

If the logic interface 110 is a converter, the logic interface 110 disables 615 the communication buffer 127. As a result, the logic interface 110 does not receive channel communications 251 and/or messages 253 via the dedicated bus 125. The logic interface 110 further determines if a message 253 is received. If no message 253 is received, the logic interface 110 remains in the logic interface wait state 351. If the message 253 is received, the logic interface 110 activate 625 a safety fault such as by asserting the active safety fault signal 147. In addition, the logic interface 110 may enter the safety fault state 359 and the method 600 ends.

If the logic interface 110 is an inverter, the logic interface 110 may determine 625 if a message 253 is received. The logic interface 110 may determine 625 if the message 253 is received from the discovery message signal 131 in the logic interface wait state 301. If no message 253 is received, the logic interface 110 continues to monitor for a message 253.

If the message 253 is received, the logic interface 110 may determine 630 the message characteristics. The logic interface 110 may determine 630 the message characteristics from the discovery message signal 131 and the initial message signal 133. Alternatively, the logic interface 110 may determine 630 the message characteristics from the message counter 201 and the discovery message flag 203. If the message 253 is an initial discovery message 253, the logic interface 110 sends 635 the discovery message response 263 and continues to monitor for a message 253. If the message 253 is not an initial message 253 and not the discovery message 253, the logic interface 110 determines 640 if the message 253 includes a valid safety command 273. In one embodiment, the logic interface 110 compares the message 253 and/or a command 273 embedded in the message 253 to the valid safety command registers 129 or the valid safety command template 205 to determine if the message 253 includes a valid safety command 273 while in the execute message and respond state 307.

If the message 253 includes a valid safety command 273, the logic interface 110 may execute 645 the valid safety command and enter the run mode/safety on/off state 309 as described in step 573 of FIG. 5B. The logic interface 110 further determines 650 if a subsequent discovery message 253 is received. If no subsequent discovery message 253 is received, the logic interface 110 continues in the run mode/safety on/off state 309 and monitors for discovery messages 253. If a subsequent discovery message 253, the logic interface 110 actives 655 a safety fault such as by asserting the activate safety fault signal 147 and entering the safety fault state 305.

At step 640, if the message 253 does not include a valid safety command 273, the logic interface 110 activates 555 the safety fault and the method 600 ends. The logic interface 110 may activate 555 the safety fault by asserting the activate safety fault signal 147. In one embodiment, the logic interface 110 enters the safety fault state 305.

Figure 6A:
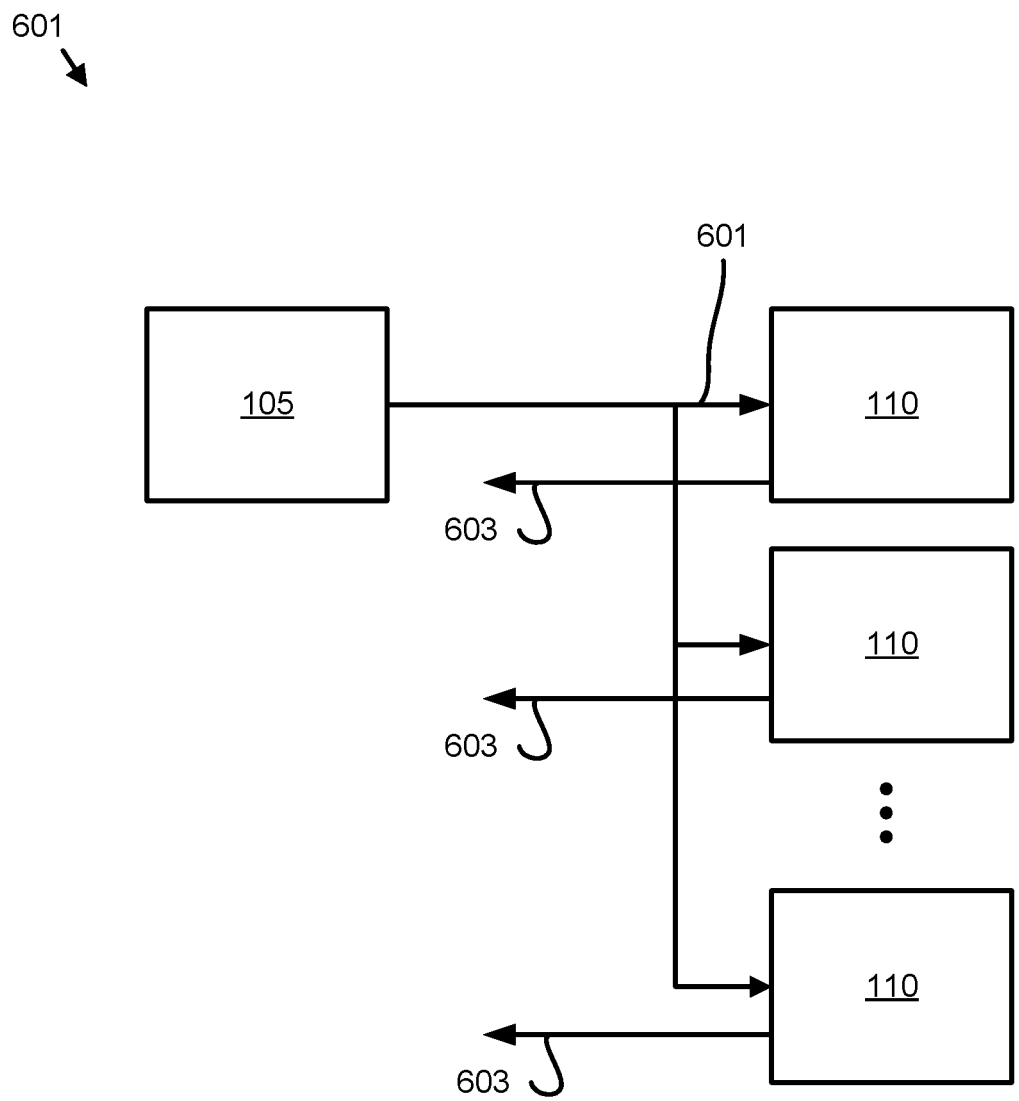
FIG. 6A is a schematic block diagram of a safety system operating properly according to an embodiment.

FIG. 6A is a schematic block diagram of the safety system 100 operating properly. In the depicted embodiment, communications are enabled 601 from the communication master 105 to each logic interface 110. In addition, communications are enabled 603 from each logic interface 110 to the communication master 105. In one embodiment, FIG. 6A is exemplary of the safety system 100 subsequent to one or more of the run mode state 341, the run mode/safety on/off state 309, the enter run mode step 545, and the enter run mode step 545/573.

Figure 6B:
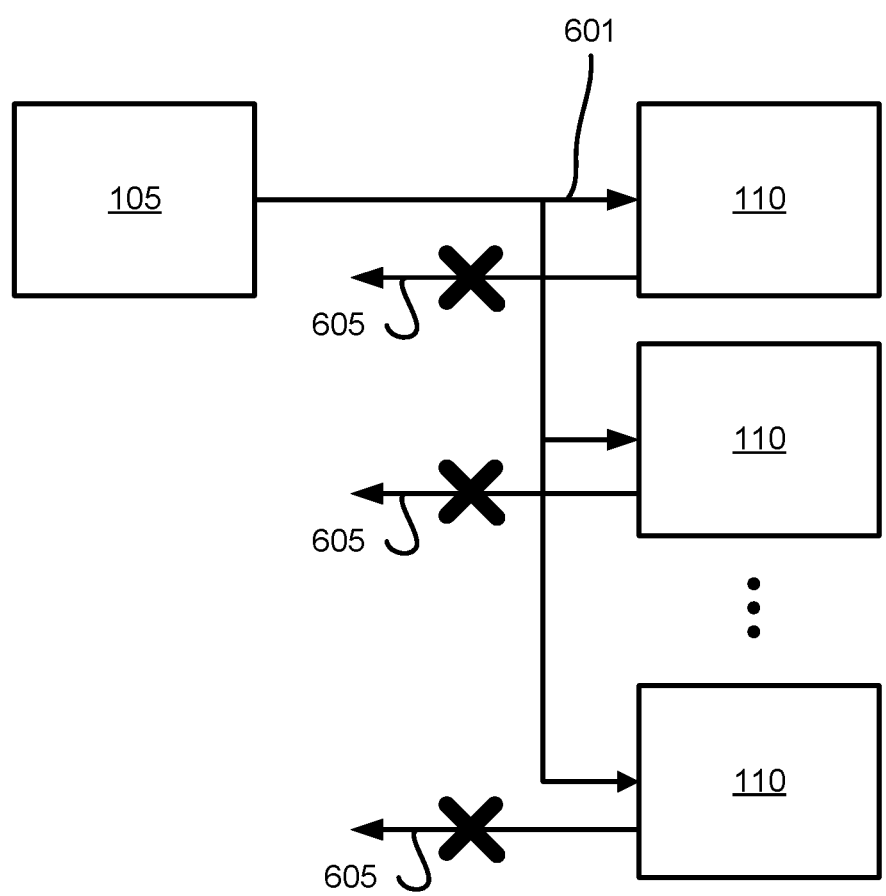
FIG. 6B is a schematic block diagram of a safety system with logic interfaces in reset according to an embodiment.

FIG. 6B is a schematic block diagram of the safety system 100 with logic interfaces 110 in reset and/or powered off. In the depicted embodiment, communications are enabled 600 one from the communication master 105 to each logic interface 110. However, communications are not enabled 605 from logic interfaces 110 to the communication master 105. In one embodiment, FIG. 6B is exemplary of one or more of the discovery state 331, the send discovery step 505, the reset step 605, and the disable communications buffer step 615.

Figure 6C:
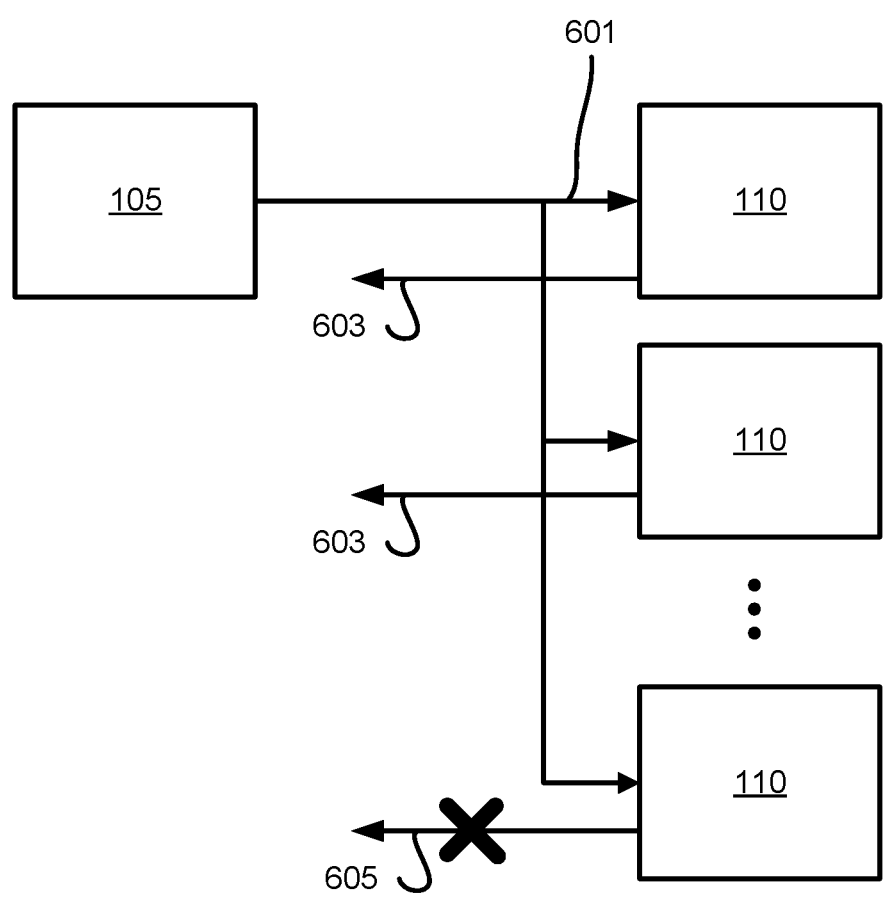
FIG. 6C is a schematic block diagram of a safety system with a noisy channel according to an embodiment.

FIG. 6C is a schematic block diagram of the safety system 100 with a noisy channel. The noisy channel may be the dedicated bus 125 when adversely affected by noise such as during power on. In the depicted embodiment, communications are enabled 601 from the communication master 105 to the logic interfaces 110. Communications are also enabled 603 from one or more logic interfaces 110 to the communication master 105. However, communications are not enabled 605 from one or more logic interfaces 110 to the communication master 105. FIG. 6C may be exemplary of one or more of the record logic interfaces state 335, the send responding logic interface identifiers to firmware state 337, the send safety to responding logic interfaces state 339, the run mode 341, and the enter run mode step 545/573. The logic interface 110 with the communications not enabled 605 may be exemplary of the safety fault state 305 and/or no discovery messages 253 being received 311 in the logic interface wait state 301.

Figure 6D:
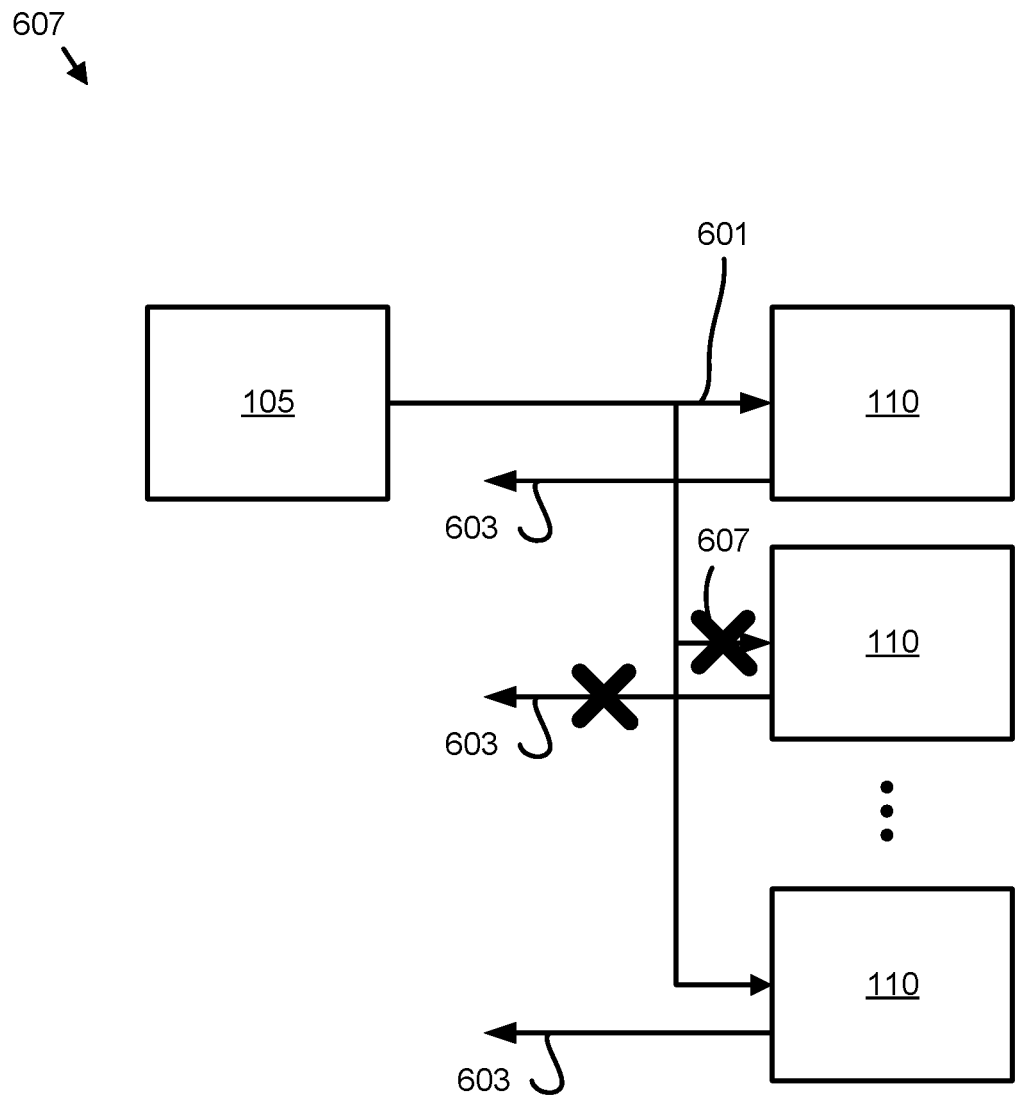
FIG. 6D is a schematic block diagram of a safety system with a noisy channel according to an alternate embodiment.

FIG. 6D is a schematic block diagram of the safety system 100 with the noisy channel. In the depicted embodiment, communications are enabled 600 one from the communication master 105 to the logic interfaces 110. Communications are also enabled 603 from one or more logic interfaces 110 to the communication master 105. However, communications are not enabled 605 from one or more logic interfaces 110 to the communication master 105. However, communications are not enabled 605 from one or more logic interfaces 110 to the communication master 105. In addition, communications are not enabled 607 from the communication master 105 to one or more logic interfaces 110. The logic interface 110 with communications not enabled 605/607 may be exemplary of the safety fault state 305 and/or no discovery messages 253 being received 311 in the logic interface wait state 301.

Figure 6E:
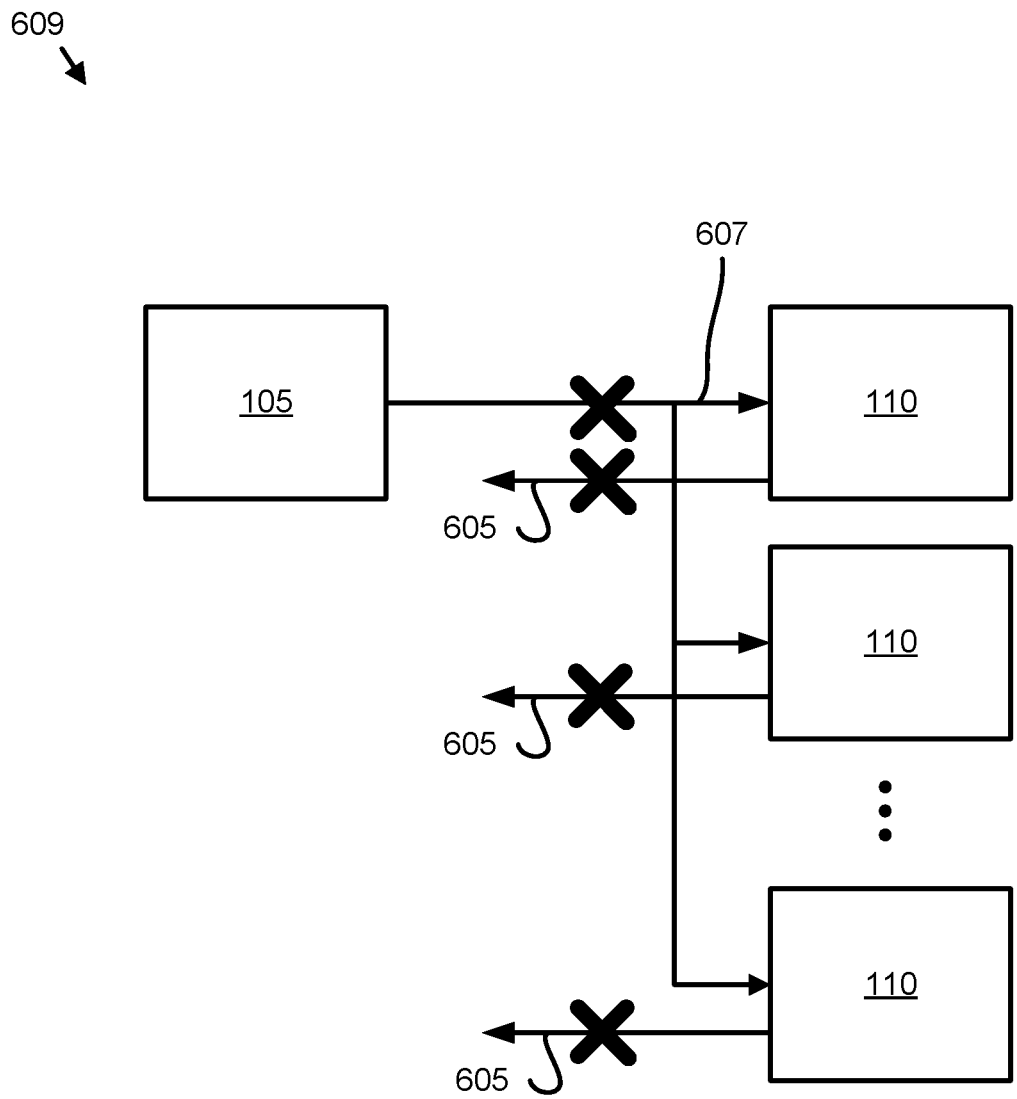
FIG. 6E is a schematic block diagram of a safety system with a communication master in reset.

FIG. 6E is a schematic block diagram of the safety system 100 with the communication master 105 in reset. In the depicted embodiment, communications are not enabled 605 from the communication master 105 to the logic interfaces 110. In addition, communications are not enabled 607 from the communication master 105 to the logic interfaces 110.

Problem/Solution

It is vital that industrial equipment always be activated under stringent safety conditions. When equipment is reset or powered on, communications should be established with controllers and control interfaces that manage the equipment. In addition, equipment should always be reset and/or powered up into safe states.

As part of this discovery and transition process, communications between the communication master 105 and the logic interfaces 110 are established. However, because the communication master 105 and the logic interfaces 110 may be reset and/or powered on independently, communications must be established in a predictable, deterministic manner regardless of when each of the communication master 105 and the logic interfaces 110 are reset. In addition, it is necessary that the logic interfaces 110 and/or equipment units 120 remain in a safe state until communications are established and the logic interfaces 110 are commanded to de-assert functional safety.

The embodiments discover and safely transition all transactors including the communication master 105, the logic interfaces 110, and the equipment units 120 to a run mode regardless of when each is reset and/or powered on. The embodiments determine if a message 253 from the communication master 105 is a discovery message 253 and/or an initial message 253. If the message 253 is not the discovery message to 53 and is the initial message, the embodiments activate a safety fault. If the message 253 is not the discovery message 253 and is not the initial message 253, the embodiments determine whether the message 253 includes a valid safety command 273 and in response to including the valid safety command 273, enters the run mode.

As a result, only communications that strictly follow safety protocol result in the logic interfaces 110 and equipment units 120 entering the run mode. Miscommunications caused by differences in when the communication master 105, logic interfaces 110, and equipment units 120 are reset and/or noise are mitigated, allowing the system 100 to safely enter the run mode.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
   a message module that determines if a message received from a communication master after a reset is a discovery message and determines if the message is an initial message received from the communication master;

a command module that:
in response to the message not being the discovery message and the message being the initial message, activates a safety fault;
in response to the message not being the discovery message and not being the initial message, determines whether the message comprises a valid safety command, wherein in response to the message comprising a valid safety command, the command module enters a run mode,
wherein message module and the command module are implemented in semiconductor hardware.

2. The apparatus of claim 1, wherein in response to the message being the discovery message and being the initial message, the command module sends a discovery message response.

3. The apparatus of claim 1, wherein the message module further determines if a logic interface is an inverter logic interface and determines if the message is a discovery message and an initial message in response to the logic inverter being the inverter logic interface.

4. The apparatus of claim 3, wherein in response to determining that the logic interface is a converter logic interface, the command module disables a communications buffer for the logic interface.

5. The apparatus of claim 4, wherein in response to disabling the communication buffer and receiving a message, the command module activates a safety fault.

6. The apparatus of claim 1, wherein the message module and the command module communicate with the communications master over a dedicated bus.

7. The apparatus of claim 6, wherein the dedicated bus is not a Fiber Link channel.

8. The apparatus of claim 1, wherein the communications master and a logic interface 110 embodying the apparatus are reset independently.

9. The apparatus of claim 8, wherein the logic interface is a first logic interface of a plurality of logic interfaces and the plurality of logic interfaces are not reset in a specified order.

10. A method comprising:
sending, by use of a processor, a discovery message to a logic interface;
in response to receiving a discovery message response from a responding logic interface, recording a responding logic interface identifier for the responding logic interface;
in response to a loop count exceeding a loop threshold, sending a safety message to the responding logic interface.

11. The method of claim 10, the method further comprising sending the responding logic interface identifier to firmware in response to the loop count exceeding the loop threshold.

12. A method comprising:
determining, by use of semiconductor hardware, if a message received from a communication master after a reset is a discovery message;
determining if the message is an initial message received from the communication master;
in response to the message not being the discovery message and the message being the initial message, activating a safety fault; and
in response to the message not being the discovery message and not being the initial message, determining whether the message comprises a valid safety command, wherein in response to the message comprising a valid safety command, entering a run mode.

13. The method of claim 12, wherein in response to the message being the discovery message and being the initial message, sending a discovery message response.

14. The apparatus of claim 1, the method further determining if a logic interface is an inverter logic interface and determining if the message is a discovery message and an initial message in response to the logic inverter being the inverter logic interface.

15. The method of claim 14, wherein in response to determining that a logic interface is a converter logic interface, disabling a communications buffer for the logic interface.

16. The method of claim 15, wherein in response to disabling the communication buffer and receiving a message, the method further comprises activating a safety fault.

17. The method of claim 12, wherein the semiconductor hardware communicates with the communications master over a dedicated bus.

18. The method of claim 17, wherein the dedicated bus is not a Fiber Link channel.

19. The method of claim 12, wherein the communications master and a logic interface are reset independently.

20. The method of claim 19, wherein the logic interface is a first logic interface of a plurality of logic interfaces and the plurality of logic interfaces are not reset in a specified order.

* * * * *